United States Patent [19]

Mirsberger et al.

[11] Patent Number: 4,596,503

[45] Date of Patent: Jun. 24, 1986

[54] EXPANSION DOWEL ASSEMBLY WITH PIVOTALLY DISPLACEABLE TONGUES

[75] Inventors: Helmut Mirsberger, Munich; Franz Popp, Puchheim, both of Fed. Rep. of Germany

[73] Assignee: Hilti Aktiengesellschaft

[21] Appl. No.: 669,590

[22] Filed: Nov. 8, 1984

[30] Foreign Application Priority Data

Nov. 14, 1983 [DE] Fed. Rep. of Germany ....... 3341211

[51] Int. Cl.⁴ ............................................. F16B 13/06
[52] U.S. Cl. ...................................... 411/32; 411/57; 411/74
[58] Field of Search ........................ 411/32, 57, 59, 60, 411/71, 72, 73, 74

[56] References Cited

U.S. PATENT DOCUMENTS 3,516,324 6/1970 Berner .............................. 411/60 X
4,523,880 6/1985 Isler ................................. 411/537 X

FOREIGN PATENT DOCUMENTS 64768 5/1982 European Pat. Off. .............. 411/71
457981 8/1968 Switzerland .
479811 11/1969 Switzerland .......................... 411/72
556979 12/1974 Switzerland .......................... 411/73
1141913 2/1969 United Kingdom .................. 411/72

Primary Examiner—Kenneth J. Dorner
Assistant Examiner—Adrian H. Whitcomb, Jr.
Attorney, Agent, or Firm—Toren, McGeady, Stanger, Goldberg & Kiel

[57] ABSTRACT

An expansion dowel assembly consists of an axially extending sleeve and a spreading element. Tongues are pivotally displaceably connected to the sleeve and are located one after the other along the axial direction of the sleeve. The tongues are split in the axial directions and can be pivoted inwardly and outwardly relative to the sleeve. Lugs are formed on the radially inner surface of the tongues and project axially beyond one end of the tongues. The lugs afford axial support for the tongues pivoted outwardly relative to the outside surface of the sleeve. The spreading element holds the tongues in the outwardly pivoted condition so that the tongues provide a mechanical lock for the sleeve within a hollow space within a structural member.

9 Claims, 4 Drawing Figures

U.S. Patent  Jun. 24, 1986  4,596,503
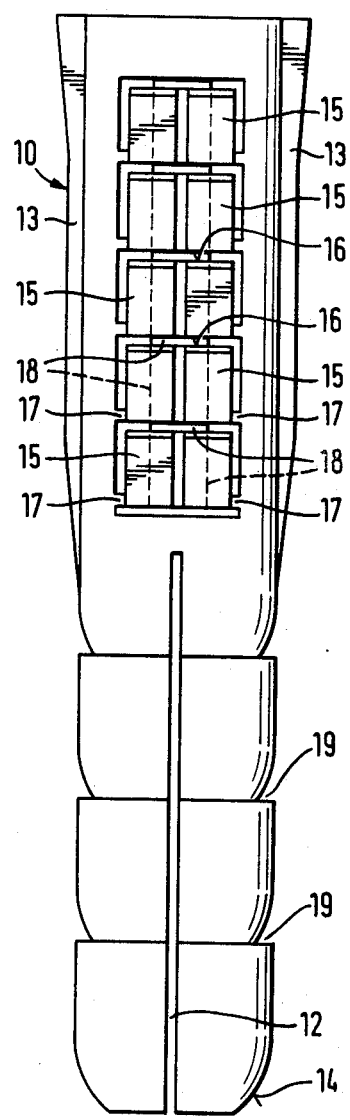
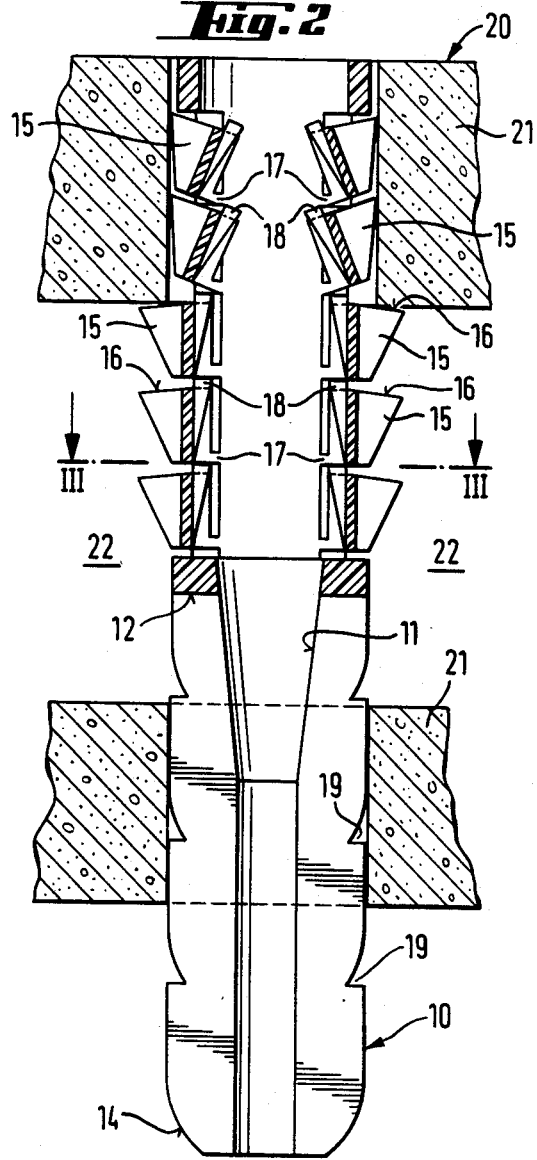
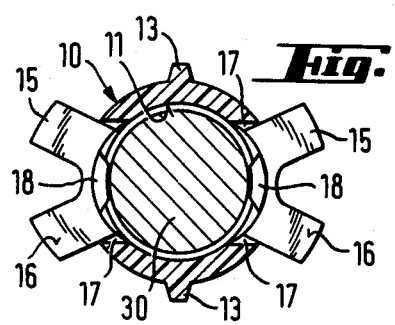
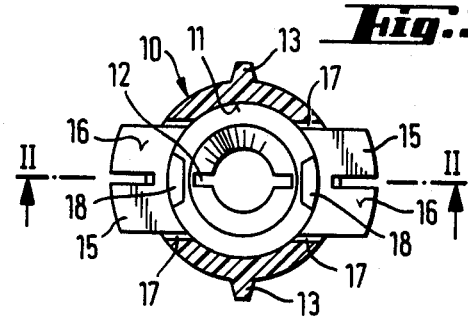

EXPANSION DOWEL ASSEMBLY WITH PIVOTALLY DISPLACEABLE TONGUES

SUMMARY OF THE INVENTION

The present invention is directed to an expansion dowel assembly formed of an axially extending sleeve and a spreading element. Tongues are pivotally connected to the sleeve and extend along at least a part of the axial length thereof arranged one behind the other. The spreading element can be inserted within the bore formed in the sleeve and it displaces the tongues radially outwardly beyond the outside surface of the sleeve. The tongues can be pivoted inwardly into the sleeve bore when the sleeve is inserted into a structural member.

With the expansion dowels used up until the present time, it has been difficult to secure the dowel within receiving materials or structural members having interior cavities or hollow spaces. Expansion dowels intended for use in solid materials cannot be used in materials with hollow spaces or cavities because the dowels are too short and, as a result, usually extend only into the first hollow space. Making the dowels longer has not helped, since the portion of the dowel present within a solid part of the receiving material is small as compared to the total length of the dowel. The anchoring effect afforded by friction attainable in the known expansion dowel is not sufficient to achieve satisfactory anchoring values where the receiving material contains interior hollow spaces. For effective anchoring values, a combination of frictional and mechanical locking is needed. Since the arrangement of the solid portions in the receiving material or structural member varies in different products and is not visible from the exterior, the expansion dowel must be constructed so that both mechanical locking and frictional locking is possible with the same dowel.

One known expansion dowel for use in similar situations has a sleeve-type dowel body with radially pivotal tongues connected to it. The free ends of the tongues have a radial extent greater than the thickness of the sleeve wall. The tongues project inwardly into the bore formed by the sleeve by the amount of the excess radial dimension over the sleeve thickness when the tongues are retracted into the sleeve bore. Since the location of the hollow spaces within the interior of the receiving material or structural member is not visible from the exterior, it is possible that a tongue may extend partly into the hollow space while another part is located within the solid material forming the structural member. In such a situation, the tongue of the known dowel cannot be displaced radially outwardly. If such a situation affects several tongues at the same time, the anchoring value of the expansion dowel may be substantially reduced.

It is a primary object of the present invention to provide an expansion dowel assembly for use in receiving materials or structural members containing interior hollow spaces so that the dowel has an improved anchoring value as compared to known dowels.

In accordance with the present invention, the tongues formed in the dowel sleeve are split in the axial direction of the sleeve for at least a part of their length and also for a part of the radial extent of the tongue. Further, each tongue has a supporting lug on its inside surface which is located within the bore formed by the sleeve.

Due to the split formed in the axial direction, the tongues can be deformed so that they adapt in an optimum manner to the receiving material. When the spreading element is inserted into the bore of the dowel sleeve, the tongues are displaced radially outwardly, by the contact between the spreading element and the supporting lugs on the tongues, into a position extending outwardly from the outside surface of the dowel sleeve. Accordingly, the mechanical interengagement is provided between the solid material defining the hollow spaces in the receiving material when the expansion dowel has tongues arranged in accordance with the present invention.

For the optimum adaptation of the expansion dowel to the receiving material, the tongues are split for their entire length in the axial direction of the sleeve. With such an axially extending split extending over the full axial length, the tongues along the split can be displaced into a diverging V-shaped configuration when a spreading element is driven into the bore in the sleeve. As a result, an effective anchoring of the dowel within the hollow space in the receiving material can be effected. In the radial direction the axially extending split extends only for a portion of the radial dimension of the tongue, whereby the dowel maintains a sufficient stiffness when it is introduced or driven into a borehole, that is, the sleeve does not deform.

When the expansion dowel is set within a structural member and is under axial load, it is mainly the tongues in gripping contact with the interior surface of the structural member that experience considerable stress. To avoid excessive stress on such tongues, the supporting lugs are arranged so that they extend axially beyond the free ends of the tongues. Accordingly, the tongues in gripping contact with the interior surfaces of the structural member can, by means of the supporting lugs, brace themselves against the axially adjacent tongues. As a result, the stress developed when the expansion dowel is under axial load is distributed over a series of tongues arranged one behind the other in the axial direction of the dowel. Therefore, an overload on one of the tongues is avoided in a practical manner.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is an elevational view of an expansion dowel embodying the present invention;

FIG. 2 is an axially extending sectional view of the expansion dowel illustrated in FIG. 1 inserted into a receiving material or structural member with interior hollow spaces, before a spreading element is introduced into the dowel, with the section being taken along the line II—II in FIG. 3;

FIG. 3 is a transverse sectional view of the expansion dowel taken along the line III—III in FIG. 2; and FIG. 4 is a transverse sectional view, similar to FIG. 3, however, with the spreading element inserted into the dowel.

DETAILED DESCRIPTION OF THE INVENTION

In the drawing an expansion dowel assembly is illustrated formed of a dowel body or sleeve 10 and a spreading element 30. While the sleeve 10 is shown in each of FIGS. 1-4, the spreading element 30 is shown only in FIG. 4. As viewed in FIGS. 1 and 2, the sleeve has a leading end at the lower end and a trailing end at the upper end, that is, when the dowel or sleeve is inserted into a structural element or receiving material, the leading end is inserted first. The axially extending sleeve 10 forms a sleeve bore 11 extending between the trailing and leading ends for substantially the full axial length of the dowel. As can be seen in FIG. 2, the bore has a larger diameter from the trailing end for approximately half of the axial length of the sleeve 10 and then has a frusto-conical section where the surface of the bore 11 converges inwardly toward the leading end with a smaller diameter cylindrically shaped section extending from the frusto-conical section to the leading end of the sleeve. Further, the sleeve 10 has diametrically opposite slots 12 extending from the leading end of the sleeve to approximately the end of the frusto-conical section closer to the trailing end of the sleeve. Two axially extending ribs 13 are located on the outside surface of the sleeve 10 and extend from the trailing end to approximately the location of the trailing end of the slots 12. In other words, the ribs 13, which are located on diametrically opposite sides of the sleeve, extend for about half of the axial length of the sleeve. These ribs 13 afford reinforcement for the sleeve. To facilitate the insertion of the sleeve 10 into a borehole formed in a receiving material or structural member 20, the leading end of the sleeve has a chamfered surface 14. In the portion of the sleeve 10 extending from the trailing end for approximately the axial length of the larger diameter bore section, radially pivotal tongues 15 are formed in the wall of the sleeve and are connected to the sleeve. In the normal position, the tongues 15 project radially outwardly from the outside surface of the sleeve. Each tongue 15 has a leading end closer to the leading end of the sleeve and a trailing end closer to the trailing end of the sleeve. The leading ends of the tongues are connected to the sleeve 10 via the joints 17 while the trailing ends of the tongues are free relative to the sleeve. As can be seen in FIG. 1, the tongues are connected to the sleeve only at the leading end and are free about the remaining peripheral edges of the tongues. To afford improved deformability of the tongues 15 each tongue is split or slotted in the axial direction of the sleeve from its leading end to its trailing end so that each tongue is divided by the slot into two axially extending tongue halves. Furthermore, as can be seen in FIG. 3, the slots dividing the tongues in the axial direction extends radially inwardly from the radially outer surface of the tongue toward the inside surface, however, the tongues are not slotted for the full radial extent. Each tongue has a supporting lug 18 located on its inside surface so that the lug projects radially into the bore 11 in the normal position of the tongue, that is, the position where the tongue projects outwardly from the outside surface of the sleeve as shown in FIG. 3. As can be seen in FIG. 2, the lugs 18 extend from the leading end of each tongue and project axially from the trailing end or free end 16 of each tongue. The supporting lugs 18 project from the free end of one tongue to the adjacent leading end of the next tongues in the direction toward the trailing end of the sleeve. To improve the anchoring effect of the dowel within the structural member 20, in the axially extending part of the sleeve containing the axially extending slots 12, the leading half of the sleeve, that is, between the tongues and the leading end of the sleeve, is provided with a number of axially spaced circumferentially extending grooves 19. Each groove 19 has a surface closer to the leading end of the sleeve which extends substantially perpendicularly to the axis of the sleeve and another surface which extends toward the trailing end of the sleeve and is arranged obliquely relative to the sleeve axis.

In FIG. 2, the expansion dowel or sleeve 10 is inserted into a bore in a receiving material or structural element 20 containing hollow spaces 22 between the spaced members 21. As the part of the sleeve containing the tongues 15 is inserted into the structural member 20, the tongues 15 are pivotally displaced radially inwardly to the bore 11 in the sleeve. The tongues 15 pivot about the connections 17 to the sleeve. As pointed out above, the trailing ends of the tongues are free so that they can project inwardly into the bore in the sleeve. While the tongues 15 are located within the range of the spaced members 21, the tongues remain displaced radially inwardly within the bore in the sleeve. When the tongues 15 emerge from the member 21, since there is no contact with the tongue displacing it radially inwardly, the tongue returns to the normal position projecting radially outwardly from the outside surface of the sleeve. The elasticity of the connections or joints 17 between the tongues 15 and the sleeve 10 provide the required rebound for returning the tongues to the normal position as shown in FIG. 3. The sleeve 10, the connections 17 and the tongues 15 are formed of a plastics material which permits the desired return of the tongues into the normal positions. When the tongues 15 return into the normal position, it is possible for a tongue to engage the inside surface of the member 21 for maintaining the dowel body or sleeve 10 in the inserted position and preventing its movement in the axial direction out of the structural member 20. As a result, a mechanical connection or interengagement is provided between the tongues and the structural member, note FIG. 2.

When inserting a spreading element, not shown in FIGS. 2 and 3, into the sleeve from the trailing end toward the leading end, the contact between the spreading member and the supporting lugs 18 on the inside surfaces of the tongues, forces the tongues further outwardly in the radial direction and locks the tongues in this displaced position. Due to the axial slot formed in the tongues 15 the outward displacement caused by the spreading element permits an optimum adaptation of the tongues to the surface of the structural member 20. By comparing FIGS. 3 and 4, it can be noted, when the spreading element 30 is inserted into the sleeve 10, that the tongues not only move radially outwardly but the tongue halves spread apart in the circumferential direction so that the slot takes on a V-shaped appearance.

In the section in FIG. 4, the spreading element 30 is positioned in the bore 11 in the sleeve. The spreading element presses the supporting lugs radially outwardly. Since the tongues are attached to the sleeve 10 by the joints or connections 17, the tongue halves move apart in diverging relationships in the radially outward direction so that the sides of the slots assume a V-shaped appearance. Since the slot only extends inwardly from the outer side of the tongues for a portion of the radial extent of the tongues, the combination of the part of the tongues along the radially inner side of the slots and the supporting lugs permit the tongues to assume the configuration as shown in FIG. 4. With such a displacement of the tongues 15, the region of the receiving material or structural member 20 gripped by the tongues is increased and the anchoring effect is enhanced.

In the embodiment of the sleeve 10 illustrated in the drawing, the tongues 15 are located only in the trailing half of the sleeve. With the arrangement illustrated, a mixed type of anchoring is obtained with mechanical locking afforded by the tongues 15 with the members 21, and frictional locking occurring within the range of the members 21 in the leading half of the sleeve 10 which does not contain any tongues. This arrangement has the advantage over an expansion dowel where the sleeve is provided with tongues 15 over its full axial length in that an adequate distribution of anchoring forces is achieved within the members 21 of the structural member 20. If an expansion dowel has tongues 15 located along its full axial length so that only mechanical locking or interengagement is afforded, there is hardly any assurance that the tongues will effect sufficient contact at several spaced members 21 through which the expansion dowel extends. As a result, it may occur that by abutting against one member 21, the tongues 15 will be excessively stressed, while the other tongues 15, since they are not in contact with the other members 21, cannot afford any anchoring engagement. By providing the engagement of the tongues 15 with only one member 21, a desired anchoring is achieved and the possible problems, as indicated above, are avoided.

While specific embodiments of the invention have been shown and described in detail to illustrate the application of the inventive principles, it will be understood that the invention may be embodied otherwise without departing from such principles.

We claim:

1. An expansion dowel assembly comprising an axially extending sleeve having a leading end and a trailing end spaced apart in the axial direction with said leading end arranged to be inserted first into a structure into which the dowel is to be anchored, said sleeve having an inside surface defining an axially extending bore and an outside surface, a plurality of tongues hingedly attached to said sleeve with said tongues extending in the axial direction of said sleeve and in the radial direction, said tongues arranged one after the other along the axial direction of said sleeve, and a spreading element insertable into the bore in said sleeve in the axial direction thereof so that said tongues can be pivotally displaced radially outwardly from the outside surface of said sleeve, said tongues being pivotally displaceable into the bore in said sleeve radially inwardly from the inside surface thereof, wherein the improvement comprises that each said tongue has a leading end and a trailing end corresponding to the arrangement of the leading end and the trailing end of said sleeve, each said tongue has a radially outer surface and a radially inner surface, each said tongue is slotted in the axial direction and in the radial direction inwardly from the outside surface toward the inside surface thereof, and a supporting lug formed on and extending inwardly from the radially inner surface of said tongue.

2. Expansion dowel assembly, as set forth in claim 1, wherein said tongues are slotted for the full extent thereof between the leading and trailing ends thereof.

3. Expansion dowel assembly, as set forth in claim 1 or 2, wherein said tongues are connected to said sleeve at the leading ends thereof and are arranged free of the sleeve from the leading ends to the trailing ends so that the trailing ends are free ends, and said supporting lugs on said tongues extend from the leading ends thereof and project beyond the trailing free ends thereof.

4. Expansion dowel assembly, as set forth in claim 1, wherein said sleeve has a first part extending from the leading end toward the trailing end and a second part extending from the first part to the trailing end, said tongues are formed in the second part of said sleeve, the first part of said sleeve is slotted from the leading end to approximately the trailing end of the first part, and said first part has a plurality of axially spaced circumferentially extending grooves formed in the outside surface thereof.

5. Expansion dowel assembly, as set forth in claim 1, wherein said tongues have a normal position with said tongues projecting radially outwardly from the outside surface of said sleeve, a retracted position with said tongues displaced inwardly into the bore in said sleeve and a spread position when said spreading element is inserted into the bore in said sleeve and radially displaces said tongues outwardly from the normal position.

6. Expansion dowel assembly, as set forth in claim 1, wherein the leading end of said sleeve is chamfered for facilitating the insertion of the sleeve into a bore.

7. Expansion dowel assembly, as set forth in claim 4, wherein diametrically opposed ribs are provided on the second part of said sleeve extending in the axial direction thereof with said ribs spaced angularly from said tongues.

8. Expansion dowel assembly, as set forth in claim 1, wherein said sleeve and tongues are formed of a plastics material.

9. Expansion dowel assembly, as set forth in claim 1, wherein said supporting lugs extend between the leading end and the trailing end of the tongues with said supporting lugs having a pair of edges extending in the leading end-trailing end direction disposed in spaced relationship and spaced inwardly from the edges of said tongues extending in the leading end-trailing end direction.

* * * * *